UNITED STATES PATENT OFFICE.

TADEUSZ VON LEWICKI, OF WARSAW, RUSSIA.

PROCESS OF TREATING VEGETABLE JUICES.

No. 805,081. Specification of Letters Patent. Patented Nov. 21, 1905.

Application filed April 6, 1904. Serial No. 201,879.

*To all whom it may concern:*

Be it known that I, TADEUSZ VON LEWICKI, a subject of the Czar of Russia, and a resident of Warsaw, Russia, have invented a certain new and Improved Process of Treating Vegetable Juices, of which the following is a specification.

This invention relates to a process for obtaining products of value in agriculture from racchariferous vegetable juices.

The filter-press residues obtained in the sugar industry contain a considerable quantity of albuminous substances and phosphoric acid, the value of which is, however, much reduced by the fact that they are mixed with carbonate of lime, water, &c., and only form a small proportion (approximately two per cent.) of the mixture. As is known, only a small percentage of the total albumen in beet-juice coagulates under the action of heat. Two reasons must be assigned for this. On the one hand, albuminous bodies combine with certain organic acids to form certain little-known substances, so that the albumen affected does not coagulate, and, on the other hand, the proportion of albuminous bodies is in most cases very small, and this fact is very unfavorable to the process of coagulation.

The object of the present invention is to remove these disadvantages and permit of obtaining the albuminous bodies with only slight admixtures of foreign substances. The process for this purpose is as follows: The sugar-juice as taken from the diffusion batteries is first neutralized by means of sodium or potassium hydrate or other bases, so that the organic acids in question are fixed by said bases and the albumen becomes free and coagulable. The albuminous bodies about to coagulate sink, and since the larger flakes formed carry with them the smaller particles complete clarification can by this means be obtained. The coagulated albumen sinks in the juice and accumulates in the lowest part of the receptacle, and clear juice ascends and is obtained above it. Besides albuminous bodies various gum-like substances, coloring-matter, and particles of vegetable fiber, &c., accumulate in the lower part of the receptacle. All of these substances are of considerable nutritive value. When a considerable accumulation has taken place in the lower part of the vessel, the substances in question are removed from the vessel. If they are to be used as fodder and at a place near at hand, it is hardly worth while to separate them from the juice which adheres thereto. If, however, it is desired to separate them from the said juice, this can easily be effected by the process commonly in use for drying starch. The juice freed from albumen is easily filtrable and can therefore be successively treated with various purifying agents and separated by filtration from the precipitates obtained. If it is desired to separate by means of lime, a great saving of lime can be effected. With the method hitherto in use it was usual to use in addition to the quantity of lime chemically required eight or nine times that quantity in order to allow of the easy mechanical separation of the precipitates. If, however, the albumen is removed before the lime is used, effective filtration will be possible if the smallest quantity of lime is employed.

Having thus described my invention, what I claim, and desire to secure by Letters Patent, is—

1. The process of treating vegetable juices which consists in precipitating the albuminous bodies contained therein in a condition relatively free from admixture with foreign substances and separating the said albuminous bodies from the albumen-free juice prior to removing the remaining impurities therefrom.

2. The process of treating sugar-juice as taken from the diffusion batteries in the manufacture of sugar, which consists in precipitating the albuminous bodies contained therein in a condition relatively free from admixture with foreign substances by adding to the said juice an alkaline base in sufficient quantities to unite with and neutralize the organic acids therein contained and free the albumen normally combined therewith, and separating the said albuminous bodies from the albumen-free juice prior to removing the remaining impurities from the said juice.

3. The process of obtaining albuminous bodies relatively free from admixture with foreign substances, from sugar-juice which consists in adding to the said juice, as taken from the diffusion batteries in the manufacture of sugar, an alkaline base in sufficient quantities to unite with and neutralize the organic acids therein contained and free the albumen normally combined with the said organic acids, causing the albuminous substances to coagulate and finally separating the same from the sugar-juice.

In witness whereof I have signed this specification in the presence of two witnesses.

TADEUSZ VON LEWICKI.

Witnesses:
PAUL FUNCK,
ALEXANDER A. YORDES.